(12) United States Patent
Gao et al.

(10) Patent No.: US 10,247,482 B2
(45) Date of Patent: Apr. 2, 2019

(54) BENT HEAT EXCHANGER AND METHOD FOR BENDING THE HEAT EXCHANGER

(71) Applicant: Hangzhou Sanhua Research Institute Co., Ltd., Hangzhou, Zhejiang (CN)

(72) Inventors: Jianhua Gao, Zhejiang (CN); Baorong Gu, Zhejiang (CN); Yongxiang Shi, Zhejiang (CN); Weihua Liu, Zhejiang (CN); Zhi Wu, Zhejiang (CN)

(73) Assignee: Hangzhou Sanhua Research Institute Co., Ltd., Hangzhou, Zhejiang (CN)

(*) Notice: Subject to any disclaimer, the term of this patent is extended or adjusted under 35 U.S.C. 154(b) by 380 days.

(21) Appl. No.: 14/561,392

(22) Filed: Dec. 5, 2014

(65) Prior Publication Data
US 2015/0168071 A1 Jun. 18, 2015

(30) Foreign Application Priority Data

Dec. 13, 2013 (CN) .......................... 2013 1 0681338
Jun. 16, 2014 (CN) .......................... 2014 1 0265424

(51) Int. Cl.
*F28D 1/047* (2006.01)
*B23P 15/26* (2006.01)
(Continued)

(52) U.S. Cl.
CPC ............ *F28D 1/0476* (2013.01); *B23P 15/26* (2013.01); *F28D 1/0233* (2013.01); *F28F 9/02* (2013.01);
(Continued)

(58) Field of Classification Search
CPC .................................................. F28D 1/0476
(Continued)

(56) References Cited

U.S. PATENT DOCUMENTS 5,531,268 A * 7/1996 Hoshino et al. ...... F28D 1/0476
165/149
6,546,999 B1 4/2003 Dienhart et al.
(Continued)

FOREIGN PATENT DOCUMENTS

CN 101532786 A 9/2009
CN 101865574 A 10/2010
(Continued)

OTHER PUBLICATIONS

Extended European Search Report dated Apr. 6, 2015 and the European Search Opinion dated Apr. 15, 2015 from a corresponding European Application No. 14197077.
(Continued)

*Primary Examiner* — Allen J Flanigan
(74) *Attorney, Agent, or Firm* — Wolf, Greenfield & Sacks, P.C.

(57) ABSTRACT

A bent heat exchanger includes a first manifold, a second manifold, and a plurality of flat tubes each being configured to communicate the first manifold with the second manifold, and fins between the flat tubes; wherein the flat tube includes a first straight section, a second straight section and a bent section connecting the first straight section with the second straight section. The bent section includes the first twisted section connected to the first straight section, the second twisted section connected to the second straight section, and the connecting section connecting the first twisted section with the second twisted section, and the connecting section of the flat tube has a substantially flat shape or a flat arc shape. In this way, the height of the bent heat exchanger can be reduced, which facilitates the installation and improves the heat exchange performance of the heat exchanger.

10 Claims, 9 Drawing Sheets

(51) Int. Cl.
*F28D 1/02* (2006.01)
*F28F 9/02* (2006.01)
*F28F 9/26* (2006.01)
*F28F 1/02* (2006.01)

(52) U.S. Cl.
CPC .............. *F28F 9/262* (2013.01); *F28F 1/022* (2013.01); *F28F 2255/00* (2013.01); *Y10T 29/4935* (2015.01); *Y10T 29/49378* (2015.01); *Y10T 29/49391* (2015.01)

(58) Field of Classification Search
USPC ................................ 165/150, 152, 175, 176
See application file for complete search history.

(56) References Cited

U.S. PATENT DOCUMENTS

| | | | | |
|---|---|---|---|---|
| 2003/0183378 | A1* | 10/2003 | Memory et al. | ...... F28D 1/0476 165/153 |
| 2011/0094257 | A1 | 4/2011 | Rusignuolo | |
| 2011/0247791 | A1* | 10/2011 | Jiang et al. | ......... F28D 1/05366 165/173 |
| 2012/0279689 | A1* | 11/2012 | Wang et al. | .......... F28D 1/0426 165/144 |
| 2013/0240185 | A1* | 9/2013 | Katoh | ................... F28D 1/0426 165/140 |
| 2014/0366571 | A1 | 12/2014 | Gao et al. | |

FOREIGN PATENT DOCUMENTS

| | | | |
|---|---|---|---|
| CN | 101978237 A | 2/2011 | |
| CN | 103196259 A | 7/2013 | |
| CN | 203286911 U | 11/2013 | |
| DE | 19830863 A1 | 1/2000 | |
| JP | 07146089 A * | 6/1995 | ........... F28D 1/0476 |
| JP | 2010169289 A | 8/2010 | |

OTHER PUBLICATIONS

Chinese First Office Action for Application No. CN 201310681338.3 dated Apr. 20, 2016.

* cited by examiner

BENT HEAT EXCHANGER AND METHOD FOR BENDING THE HEAT EXCHANGER

This application claims the benefit of priorities to Chinese Patent Application No. 201410265424.0 titled "BENT HEAT EXCHANGER", filed with the Chinese State Intellectual Property Office on Jun. 16, 2014 and Chinese Patent Application No. 201310681338.3 titled "BENT HEAT EXCHANGER AND METHOD FOR BENDING THE HEAT EXCHANGER", filed with the Chinese State Intellectual Property Office on Dec. 13, 2013, the entire disclosures of which are incorporated herein by reference.

TECHNICAL FIELD

The present application relates to the field of heat exchangers, and particularly to a bent parallel flow heat exchanger and a method for bending the heat exchanger.

BACKGROUND

In recent decades, automotive air conditioners have been developed rapidly and rank second in the air conditioning machinery. A heat exchanger, as one of the four main components of the automotive air conditioner, is also required to be improved to optimize the design according to the market requirements. The parallel flow heat exchanger has characteristics, such as a high cooling efficiency, a small size, a light weight and etc., thus can meet the requirements of the market quite well, and in recent years, it has been increasingly applied in the automotive air conditioning systems.

A conventional micro-channel heat exchanger mainly includes micro-channel flat tubes, fins and manifolds. Two ends of the micro-channel flat tubes are provided with a respective manifold for distributing and collecting the refrigerant. The corrugated or louver-shaped fins are provided between adjacent micro-channel flat tubes for improving the heat exchange efficiency between the condenser and the air.

A bent heat exchanger is disclosed in U.S. Pat. No. 5,531,268 announced on Jul. 2, 1996, which includes an inlet manifold, an outlet manifold, fins and flat tubes. The flat tubes at the same layer are each formed integrally by bending, and each includes a first portion connected to the inlet manifold, a second portion connected to the outlet manifold, and a bent portion which is twisted and located at the middle. The first portion and the second portion of the flat tube are both connected to the fins, and the bent portion thereof is a finless section. In the bent heat exchanger, the inner side and the outer side of the bent portion both have an arc shape. However, in this design, the bending process of the flat tube has a low precision, which is apt to cause a partial deformation of the heat exchanger, damage structures of the fins nearby, and thus the heat exchange efficiency is reduced. Furthermore, the flat tube bent by the above manner may have a large protruding dimension after the arc-shaped bent portions are overlapped with each other, and the external dimension of the heat exchanger cannot be accurately controlled, which ultimately results in installation difficulties. Most importantly, the above manner forming the arc bending portion requires a large bending length to be reserved, and it is well known that a portion of the flat tube connected to the fins has a better heat exchange performance compared to the finless section, thus for a flat tube having a fixed length, if a length of a fined section is increased, a length of a finless section is decreased accordingly, which reduces the heat exchange performance of the heat exchanger.

With the continuous development of technology, customers have imposed increasingly high requirements on the heat exchange performance of the heat exchanger, and the structure of the heat exchanger disclosed in the above patent is difficult to adapt to the current requirements. Therefore, it is necessary to optimize the structure of the conventional bent heat exchanger and the method for bending the heat exchanger.

SUMMARY

A bent heat exchanger is provided according to the present application, which has a good heat exchange performance and facilitates the installation.

A bent heat exchanger according to present application includes a first manifold, a second manifold, and a plurality of flat tubes each being configured to communicate the first manifold with the second manifold and having a flow channel, wherein the flat tube includes a first straight section, a second straight section and a bent section between the first straight section and the second straight section, fins are provided between the first straight sections of adjacent flat tubes, fins are also provided between the second straight sections of adjacent flat tubes, and no fins are provided between the bent sections of adjacent flat tubes; the bent section includes a first twisted section, a second twisted section, and a connecting section between the first twisted section and the second twisted section, and at least a part of a line, formed along a width direction of the flat tube, of a middle portion of an upper surface of the connecting section of the bent section has a linear shape or a substantially linear shape; middle portions of the connecting sections of adjacent flat tubes are arranged to be partially overlapped; and a middle portion of a cross-section, taken along a flow direction of the flat tube, of the connecting section has a flat arc shape.

A method for bending a heat exchanger is further provided according to the present application, wherein the heat exchanger includes a first manifold, a second manifold, a plurality of flat tubes each having a flow channel, and a plurality of fins; the flat tubes are connected between the first manifold and the second manifold, each of the flat tubes includes a first straight section, a second straight section and a finless section connected between the first straight section and the second straight section; fins are provided between the first straight sections of adjacent flat tubes, and fins are also provided between the second straight sections of adjacent flat tubes; wherein the method comprises the following steps:

pressing one side of the finless section;

applying a bending force to the first straight section and the second straight section, and bending a middle portion of the finless section of each flat tube to form a connecting section connected between the first straight section and the second straight section; wherein at least a part of a line, formed along a width direction of the flat tube, of a middle portion of an upper surface of the connecting section of a bent section has a linear shape or a substantially linear shape; middle portions of the connecting sections of adjacent flat tubes are arranged to be partially overlapped; and a middle portion of a cross-section, taken along a flow direction of the flat tube, of the connecting section has a flat arc shape.

Compared with the conventional technology, in the flat tube of the heat exchanger according to the present application, the bent section includes the first twisted section, the second twisted section, and the connecting section connecting the first twisted section with the second twisted section, and the outer surface of the connecting section is limited by the planar clamp, thus an outer surface of the connecting section of the flat tube has a substantially flat shape or a flat arc shape. In this way, the height of the bent heat exchanger can be reduced, which facilitates the installation, and such bending manner does not require to reserve a long bending radius, which can increase the length of the fined section in a case that the flat tube has a fixed length, thus the heat exchange performance of the heat exchanger can be improved.

DETAILED DESCRIPTION

Expressions of "an embodiment" or "embodiment" herein refer to particular features, structures, or characteristics which may be included in at least one implementation of the present application. Expression of "in an embodiment" or "embodiment" appeared in various places in the specification do not always refer to the same embodiment, nor refer to an individual embodiment or an alternative embodiment which is exclusive with respect to other embodiments.

For effectively introducing the technical solutions of the present application to those skilled in the art to allow them to thoroughly understand the present application, numerous specific details are described in the following description, and the present application may still be achieved without these specific details. In another aspect, to avoid obscuring the object of the present application, some well-known methods or processes which are easy to understand are not described in detail in the following description.

Figure 1:
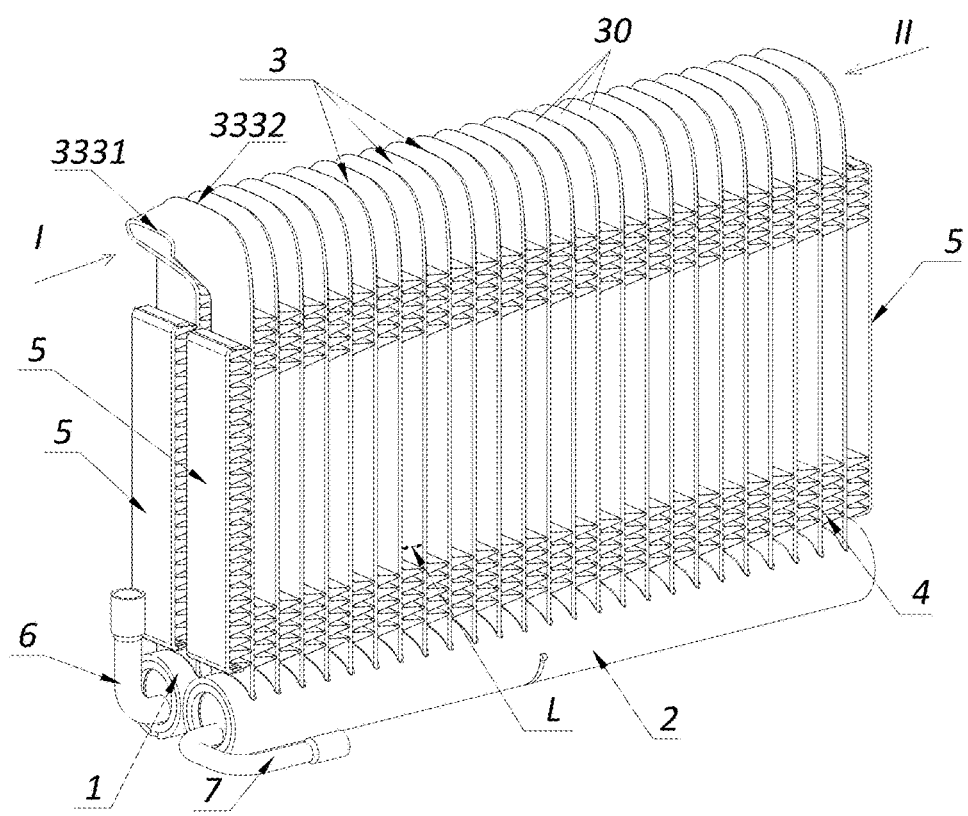
FIG. 1 is a perspective schematic view showing the structure of a heat exchanger according to an embodiment of the present application.
Figure 2:
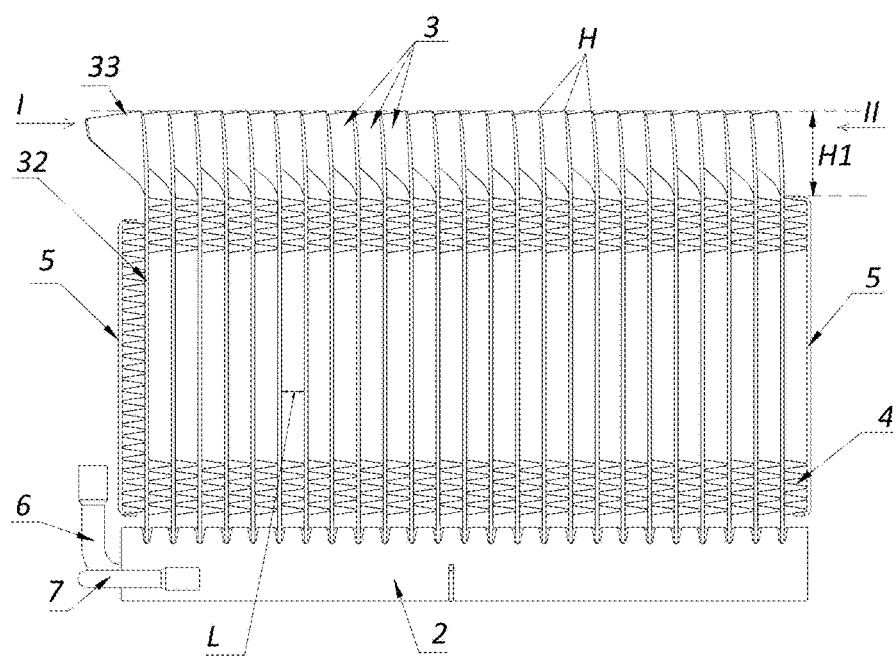
FIG. 2 is a side view of the heat exchanger shown in FIG. 1.
Figure 3:
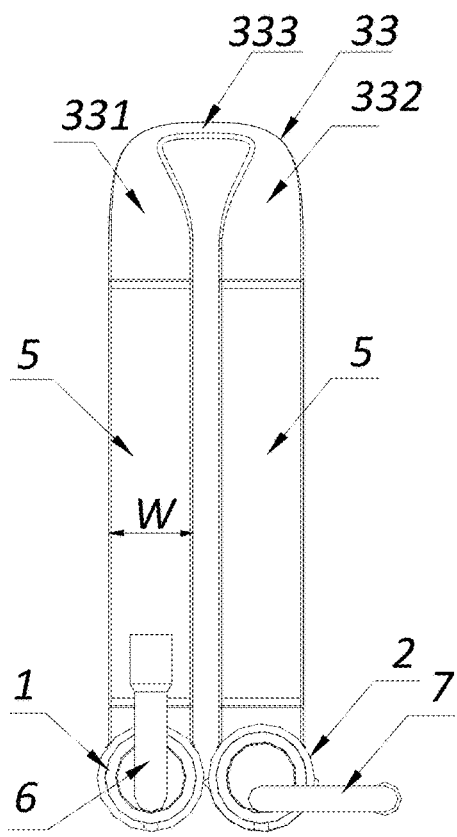
FIG. 3 is a front view of the heat exchanger shown in FIG. 1.

Reference is made to FIGS. 1, 2 and 3. FIG. 1 is a perspective schematic view showing the structure of a heat exchanger according to an embodiment of the present application, FIG. 2 is a side view of the heat exchanger shown in FIG. 1, and FIG. 3 is a front view of the heat exchanger shown in FIG. 1. As shown in FIG. 1, in an embodiment of the present application, the heat exchanger is a folded double-layer heat exchanger, which includes a first manifold 1, a second manifold 2, bent flat tubes 3 communicating the first manifold 1 with the second manifold 2, fins 4 arranged between adjacent flat tubes 3, and side plates 5 arranged outside the fins 4 arranged at two ends of the heat exchanger. Each of the first manifold 1 and the second manifold 2 includes a cylindrical hollow tube body and end caps (not numbered) at two ends of the cylindrical hollow tube body, the end caps and the cylindrical tube body together form an accommodating space which allows a heat exchange medium to flow therein. Of course, the manifold may also have other shapes, and a distribution tube or a distribution baffle may be provided inside the manifold. The end cap at one end of the first manifold 1 is provided with an inlet tube 6 in communication with the interior of the first manifold 1, and the inlet tube 6 runs through the end cap to extend into the first manifold 1. Similarly, the end cap at one end of the second manifold 2 is provided with an outlet tube 7 in communication with the interior of the second manifold 2, and the outlet tube 7 runs through the end cap to extend into the second manifold 2. An upper surface of a tube wall of the cylindrical tube body of each of the first manifold 1 and the second manifold 2 is provided with multiple flat tube slots (not numbered) which are in parallel with each other and penetrate through the tube wall of the cylindrical tube body, and the flat tubes 3 are respectively inserted into the flat tube slots on the first manifold 1 and the second manifold 2, to be in communication with the first manifold 1 and the second manifold 2. The flat tube 3 communicating the first manifold 1 with the second manifold 2 is a bent flat tube, which includes a middle bent section 33, and a first straight section 31 and a second straight section 32 at two sides (see FIG. 3). The bent sections 33 at the top of adjacent flat tubes are partially overlapped and abut against each other. The fins 4 are each formed by folding a thin aluminum sheet to a wave shape, and each layer of the fins 4 may be provided with an inclined opening (not shown), similar to a louver. As shown in FIG. 1, fins are provided between the first straight sections 31 of adjacent flat tubes, and between the second straight sections 32 of adjacent flat tubes, and no fins are provided between the bent sections 33 of adjacent flat tubes.

Figure 4:
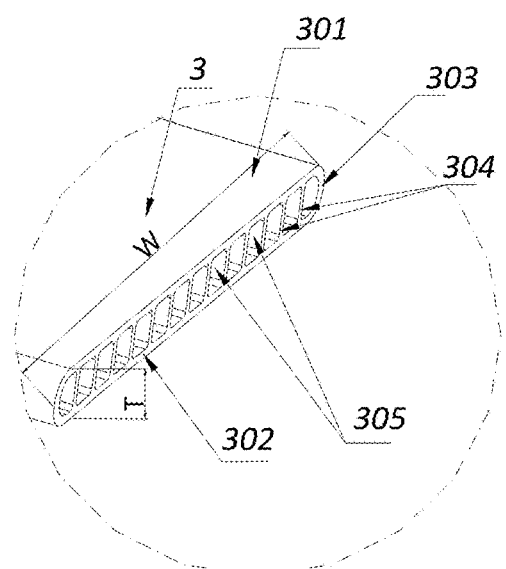
FIG. 4 is an enlarged cross-sectional schematic view of a flat tube in the heat exchanger according to the embodiment shown in FIG. 1.

Reference is further made to FIG. 4, the flat tube 3 is an elongated flat tube body which has a substantially rectangular cross section and includes an upper wall surface 301 and a lower wall surface 302 in parallel with each other and a side wall 303 connecting the upper wall surface with the lower wall surface. Several partition walls 304 are provided inside the tube body formed by the upper wall surface 301, the lower wall surface 302 and the side wall 303. An inner cavity of the tube body of the flat tube 3 is divided into several micro-channel flow channels 305 by the partition walls. The flat tube has a width W and a thickness T.

Figure 5:
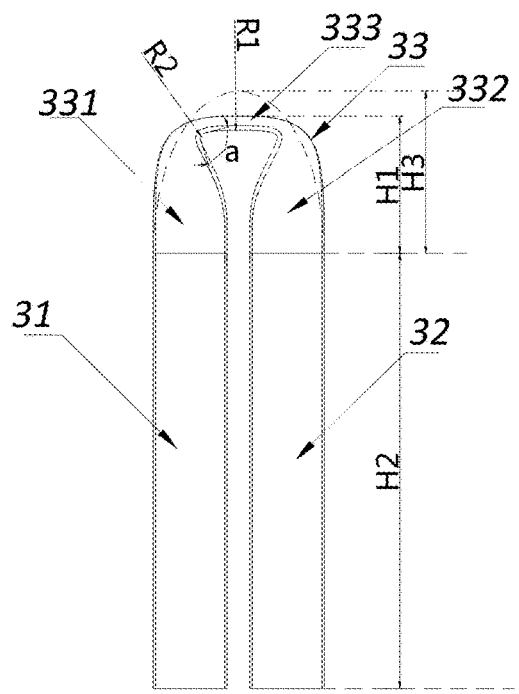
FIG. 5 is a front schematic view of a single flat tube of the heat exchanger according to the embodiment shown in FIG. 1.
Figure 6:
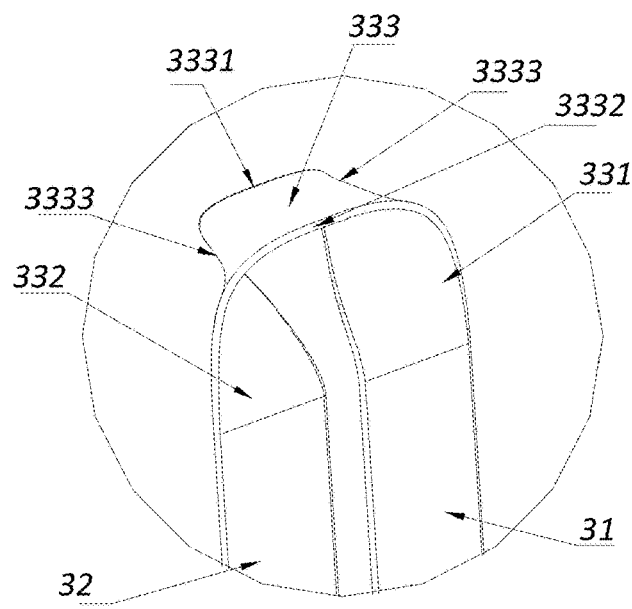
FIG. 6 is a partial enlarged schematic view showing a single flat tube of the heat exchanger in the embodiment shown in FIG. 1 viewed from another angle.

Reference is made to FIGS. 5 and 6. FIG. 5 is a front view of a single flat tube 3 of the heat exchanger shown in FIG. 1. FIG. 6 is a partial enlarged schematic view of the single flat tube 3 viewed from another angle. As shown in FIGS. 5 and 6, each flat tube 3 in the heat exchanger of FIG. 1 includes a first straight section 31 and a second straight section 32 and a bent section 33 connecting the first straight section 31 with the second straight section 32. The first straight section 31 and the second straight section 32 of the flat tube are substantially arranged in the same plane, and extending directions of the first straight section 31 and the second straight section 32 in the same plane are parallel with each other. The bent section 33 of the flat tube is located between the first straight section 31 and the second straight section 32. In other embodiments, the extending directions of the first straight section 31 and the second straight section 32 in the same plane may also form a certain angle.

The bent section 33 of the flat tube includes a first twisted section 331 connected to the first straight section 31, a second twisted section 332 connected to the second straight section 32, and a connecting section 333 between the first twisted section 331 and the second twisted section 332, and the connecting section 333, the first twisted section 331 and the second twisted section 332 are formed by bending the same flat tube. The first twisted section 331 of the bent section 33 of the flat tube is formed by twisting one end of the first straight section 31 along an axis at an angle with respect to the surface of the flat tube 3, the second twisted section 332 of the bent section 33 of the flat tube is formed by twisting one end of the second straight section 32 along an axis at an angle with respect to the surface of the flat tube 3, and the connecting section 333 is formed by bending tail ends of the first twisted section 331 and the second twisted section 332 along an axis parallel to a width direction of the flat tube.

Figure 10:
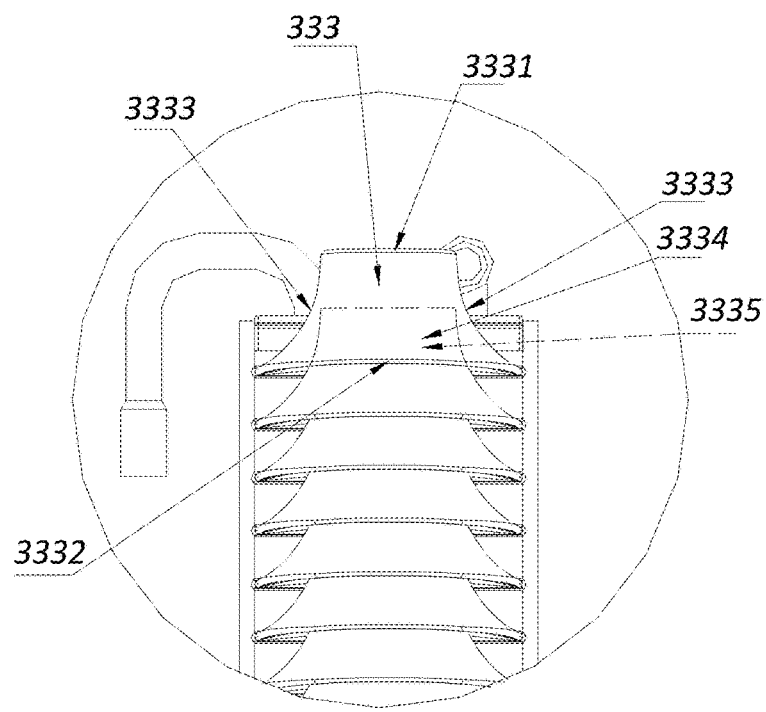
FIG. 10 is a partial enlarged schematic view of the heat exchanger according to the embodiment shown in FIG. 1 viewed from the top.

When the flat tube is bent to form the connecting section 333, a planar clamp is arranged outside the connecting section 333, thus after the flat tube is bent, a middle portion of a cross-section, along a flow direction of the flat tube 3, of the connecting section 333 of most of the flat tubes 3 has a flat arc shape or a substantially flat shape. Reference is made to FIGS. 1, 6 and 10, the expression of "a flat arc shape or a substantially flat shape" herein refers to that the middle portion of the cross-section, along the flow direction of the flat tube 3, of the connecting section 333 has a linear shape or a substantially linear shape, the expression of "a substantially linear shape" herein and hereinafter refers to that the shape is not a linear shape virtually, but looks close to a straight line from the appearance, for example, it may be an arc segment having a small curvature, or a combination of multiple arc segments each having a small curvature, or a combination of multiple arc segments each having a small curvature and at least one straight line, and so on. In the meantime, due to the clamping of the planar clamp during the bending process, at least a partial area of an upper surface of the connecting section 333 of the bent section 33 of at least a part of the flat tubes 3 is planar. Herein, the expression of "an upper surface" refers to a surface of a side of the connecting section 333 that is opposite to the first straight section 31 and the second straight section 32, for example a surface 30 shown in FIG. 1. Accordingly, the expression of "a lower surface of the connecting section 333 of the bent section 33 of the flat tube 3" hereinafter refers to a surface of a side of the connecting section 333 that is facing the first straight section 31 and the second straight section 32, and this surface is opposite to the upper surface of the connecting section 333. In addition, the connecting section 333 includes a short edge 3331 located at a lower position and a long edge 3332 located at a higher position, and in multiple cross-sections of the connecting section 333 taken along the flow direction of the flat tube 3, a bending degree of a middle portion of the cross-section that is closer to the short edge 3331 of the connecting section 333 is slightly larger than a bending degree of a middle portion of the cross-section that is closer to the long edge 3332 of the connecting section 333. In this way, the middle position of the connecting section of the bent section of the flat tube is relatively high and has a high point, and high points of at least a part of the flat tubes are substantially in the same plane, and herein, the expression of "substantially in the same plane" refers to that the height difference therebetween is small, for example, the height difference is less than 2 mm.

Figure 9:
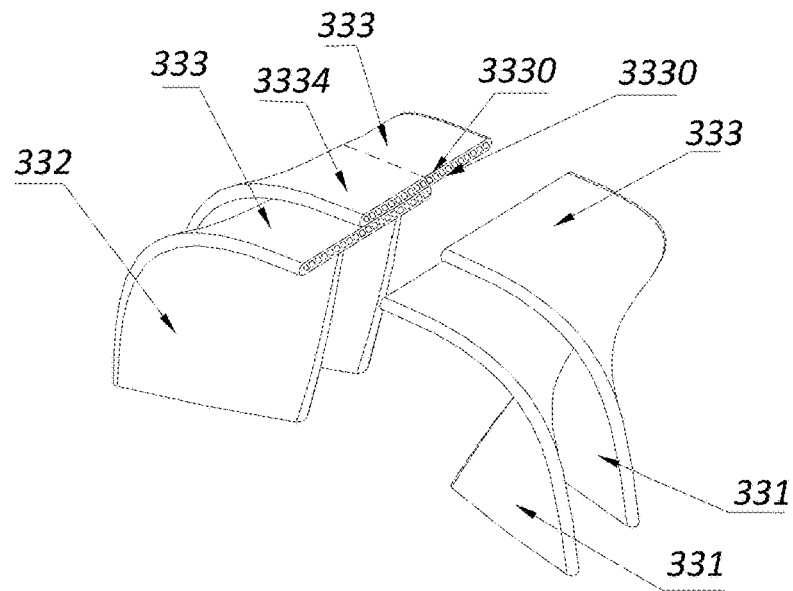
FIG. 9 is an enlarged sectional schematic view showing bent sections of two adjacent flat tubes in the heat exchanger according to the embodiment shown in FIG. 1.

In this embodiment, at least a part of a line, formed along the width direction of the flat tube 3, of a middle portion of the upper surface of the connecting section 333 of the bent section 33 has a linear shape or a substantially linear shape. That is, if the middle portion of the connecting section 333 (herein, the middle portion of the connecting section 333 includes a middle line of the connecting section 333 along the width direction of the flat tube 3, and a portion of the connecting section 333 located at two sides of the middle line and close to the middle line) is cut along the width direction of the flat tube 3, it can be seen in the formed cross-section of the connecting section 333, at least a part of an edge of the cross-section corresponding to the upper surface of the connecting section 333 (this edge is the line, formed along the width direction of the flat tube 3, of a middle portion of the upper surface of the connecting section 333) has a linear shape or a substantially linear shape. For example, as shown in FIG. 9, in this embodiment, if the connecting section 333 of the bent section 33 of the flat tube 3 is cut at the middle line of the connecting section 333 along the width direction of the flat tube 3, the formed cross-section of the connecting section 333 along the width direction of the flat tube includes two edges 3330 which respectively correspond to the upper surface and the lower surface of the connecting section 333, and at least a part of each edge 3330 has a linear shape or a substantially linear shape. In two cross-sections, along the width direction of the flat tubes, of the middle portions of the connecting sections of the bent sections of two adjacent flat tubes, the edges 3330 of the two cross-sections are parallel to each other or substantially parallel to each other, and the edges 3330 of the two cross-sections that are facing each other are partially in contact with each other. Herein, the expression of "substantially parallel to each other" refers to that the two edges 3330 are not parallel to each other virtually, however look very similar to a state that are parallel to each other from the appearance, and without precision measurement, it is difficult to discover the fact that they are not parallel to each other, for example, in a case that an angle formed between the two edges is smaller than 1 degree. Further, if the connecting section 333 is not cut at the middle line along the width direction of the flat tube 3, but is cut at either side of the middle line at a position which is slightly deviated from the middle line but still close to the middle line, then in the formed cross-section, at least a part of the edge corresponding to the upper surface of the connecting section 333 (this edge is the line, formed along the width direction of the flat tube 3, of the middle portion of the upper surface of the connecting section 333) also has a linear shape or a substantially linear shape. In other embodiments, the middle portion of the connecting section may substantially be a plane which forms a small inclined angle with respect to the horizontal plane, instead of overlapping with the horizontal plane, thus the connecting sections of the flat tubes 3 can be partially overlapped and arranged sequentially.

Figure 12:
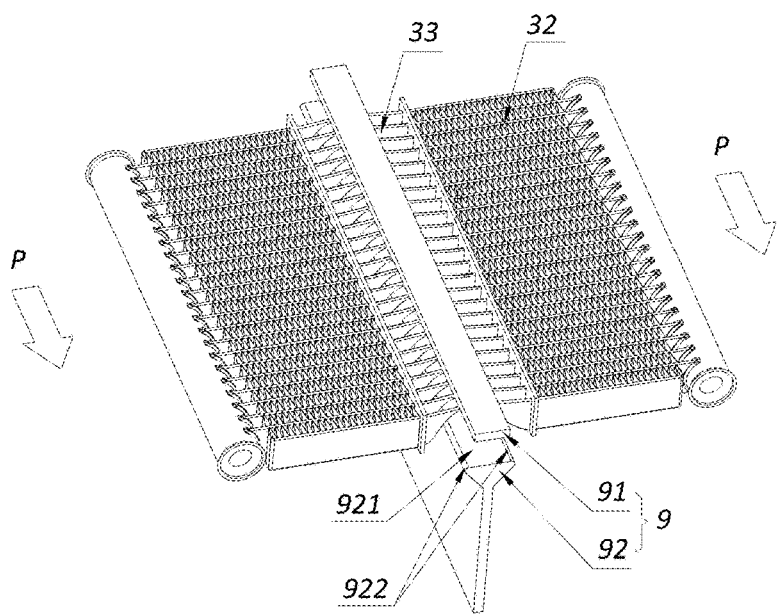
FIG. 12 is a schematic view showing the heat exchanger being clamped by a clamp and prepared to be bent.

Reference is made to FIG. 10, which is a partially enlarged view of the heat exchanger in FIG. 1 viewed from the top. As shown in FIG. 10 and in conjunction with FIG. 1, viewed from the top, the connecting section 333 of the bent flat tube 3 includes a short edge 3331 having a smaller length and formed on a lower side of the flat tube 3, a long edge 3332 having a larger length and formed on a higher side of the flat tube 3, and two arc-shaped lateral edges 3333 connecting the short edge 3331 with the long edge 3332. The arc-shaped lateral edge 3333 at one side of the connecting section 333 is connected to the first twisted section 331, and the arc-shaped lateral edge 3333 at the other side of the connecting section 333 is connected to the second twisted section 332. The connecting section 333 is substantially a trapezoid as a whole having arc lateral edges. In particular, the middle portion of the long edge 3332 has a linear shape or a substantially linear shape. Herein, the expression of "substantially linear" refers to that the shape is not a straight line virtually, but looks close to a straight line from the appearance, for example, it may be an arc segment having a small curvature, or a combination of multiple arc segments each having a small curvature, or a combination of multiple arc segments each having a small curvature and at least one straight line, and so on. The connecting sections of two adjacent flat tubes are arranged to be partially overlapped, specifically, a portion 3334 (see FIG. 10), close to the long edge, of the middle portion of the connecting section of the upper flat tube overlaps a portion 3335 (as shown by a dotted line in the Figure), close to the short edge, of the middle portion of the connecting section of the lower flat tube, and there is a gap between adjacent connecting sections at two sides of the middle portions thereof, namely, there is a gap between portions of the connecting sections of the two adjacent flat tubes other than the overlapped portions thereof. In the several flat tubes, the high points of the bent sections of at least a part of the flat tubes are substantially in the same plane. The expression of "high point" hereinabove and herein is a point of the connecting section 333 of the flat tube 3 that directly contacts the clamp and is pressed by the clamp when the flat tubes 3 is bent by using the planar clamp (for example, a clamp 9 as shown in FIG. 12, specific features of which will be described in detail below). In this embodiment, the high point is also the highest point of the cross-section, taken along the width direction of the flat tube, of the middle portion of the connecting section of the bent section of the flat tube 3, (that is, the highest point of the entire flat tube 3), for example, the point H shown in FIG. 2. In this embodiment, in the several flat tubes 3, except for two flat tubes 3 respectively provided at two ends of the bent heat exchanger, the highest points H of the cross-sections, taken along the width direction of the flat tubes, of the middle portions of the connecting sections of the bent sections of the remaining flat tubes 3 (clearly, H is the highest point of the entire flat tube 3) are substantially in the same plane.

Figure 7:
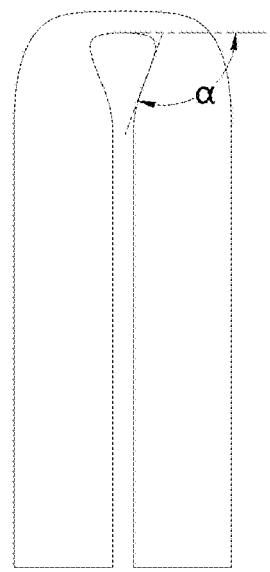
FIG. 7 is a schematic view showing a twist angle of each of a first twisted section and a second twisted section with respect to a connecting section viewed from a side of a short edge of the connecting section of the single flat tube of the heat exchanger according to the embodiment shown in FIG. 1.
Figure 8:
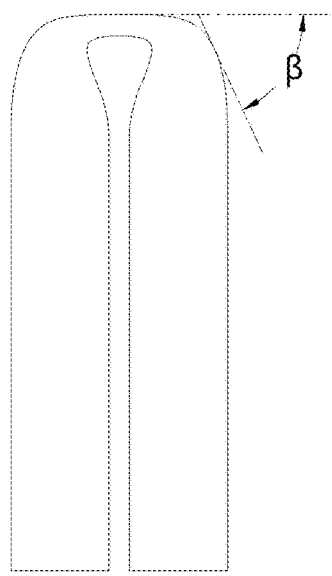
FIG. 8 is a schematic view showing a twist angle of each of the first twisted section and the second twisted section with respect to the connecting section viewed from a side of a long edge of the connecting section of the single flat tube of the heat exchanger according to the embodiment shown in FIG. 1.

Reference is made to FIG. 5 again in conjunction with FIGS. 7 and 8, when bending the flat tube 3 according to the present application, a planar clamp may be provided outside the connecting section 333, and after the flat tube 3 is bent, the cross-section of the connecting section 333 along the flow direction of the flat tube 3 has a flat arc shape or a substantially flat shape. A bending angle a is formed at a junction of the connecting section 333 and the first twisted section 331 of the flat tube 3, as well as a junction of the connecting section 333 and the second twisted section 332 of the flat tube 3. After the flat tube 3 according to the present application is bent, a radius R1 of the arc of the cross-section, taken along the flow direction of the flat tube, of the middle portion of the connecting section 333 is greater than a radius R2 of the cross-section of each of the junction of the connecting section 333 and the first twisted section 331 and the junction of the connecting section 333 and the second twisted section 332. The bending angle a of the cross-section of each of the junction of the connecting section 333 and the first twisted section 331 of the flat tube and the junction of the connecting section 333 and the second twisted section 332 of the flat tube is an acute angle, that is, the first twisted section 331 and the second twisted section 332 are each twisted by an angle $\alpha$ with respect to the connecting section 333 from respective original positions before the flat tube is bent, and the angle $\alpha$ is an obtuse angle, as shown in FIG. 7. It should be appreciated that, FIGS. 5 and 7 show the flat tube viewed from a side where the short edge of the connecting section of the flat tube 3 is located, i.e. viewed in the direction indicated by the arrow I in FIGS. 1 and 2. In this perspective, an angle formed between the connecting section 333 and a tangent line on any point, on the first twisted section 331 and the second twisted section 332, of the short edge of the connecting section of the flat tube 3 is an obtuse angle. When viewed from a side where the long edge of the connecting section of the flat tube 3 is located, i.e., viewed in the direction indicated by the arrow II as shown in FIGS. 1 and 2, the first twisted section 331 and the second twisted section 332 are each twisted by an angle $\beta$ with respect to the connecting section 333 from respective original positions before the flat tube is bent, and the angle $\beta$ is an acute angle, as shown in FIG. 8. In this perspective, an angle formed between the connecting section 333 and a tangent line on any point, on the first twisted section 331 and the second twisted section 332, of the short edge of the connecting section of the flat tube 3 is an acute angle. As shown in FIG. 5, the height H1 of the finless section of the flat tube according to the present application is lower then the height H3 of the finless section of the conventional flat tube which has a circular arc bent section indicated by a broken line in the Figure. For a flat tube having a fixed length, when the length H1 of the finless section of the flat tube is decreased, correspondingly the length H2 of the fined section of the flat tube is increased, and since the heat exchange capability of the fined section is stronger, the entire heat exchanger has a stronger heat exchange capability.

As described hereinabove, the flat tube 3 is a flat tube body, the interior of which is separated into micro channels by several partition walls 304. If the flat tube 3 is bent excessively, the outer wall of the flat tube 3 may be ruptured, or the micro channels 305 inside the flat tube 3 may be clogged, therefore, the bending height of the finless section of the flat tube 3 cannot be reduced at random, and has to meet certain conditions. The conditions to be met for the bending height of the flat tube are described hereinafter in conjunction with the bending process of the heat exchanger according to the present application.

Figure 11:
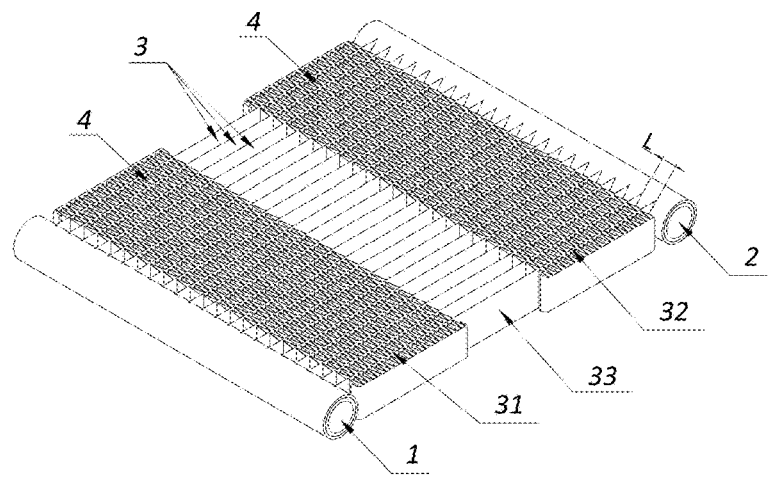
FIG. 11 is a schematic view showing the structure of the heat exchanger according to an embodiment of the present application before the heat exchanger is bent.

Reference is made to FIG. 11, which is a schematic view showing the structure of the heat exchanger in FIG. 1 before being bent. As shown in FIG. 11, the flat tube 3 of the heat exchanger shown in FIG. 1 is originally a straight flat tube which has one end inserted into the flat tube slot of the first manifold 1, and another end inserted into the flat tube slot of the second manifold 2, and a distance between adjacent flat tubes is L. The fins 4 are provided between sections of the flat tubes close to the first manifold 1 (i.e., the fins 4 are provided between the first straight sections 31 of the aforementioned flat tubes), the fins are provided between sections of the flat tubes 3 close to the second manifold 2 (i.e., the fins 4 are provided between the second straight sections 32 of the aforementioned flat tubes 3), and a section in the middle of the flat tube 3 is a finless section, and the finless section is the bent section 33 of the aforementioned flat tube 3. Since the fins are in contact with the adjacent flat tubes, the width of each of the fins is the distance L between two adjacent flat tubes.

Reference is made to FIG. 12, in the bending process, the clamp 9 is used to clamp the middle portion of the finless section of the flat tube and to press one side of the finless section, and then a force is applied to the flat tube and the manifolds of the heat exchanger from both sides along the direction of the arrow P in the Figure, thereby bending the bent section 33 of the flab tube. Before the bending process, the finless section of the flat tube 3 may be twisted to form the first twisted section 331 and the second twisted section 332. Specifically, the finless section, which is originally placed vertically, at the middle of the flat tube 3 is horizontally twisted, and there are various twisting means, for example, the clamp 9 is used to apply a pressure on the middle portion of the finless section to twist the middle portion of the finless section with respect to the first straight portion 31 and the second straight portion 32, and other operation means may also be used. After the twisting operation, the transverse wall surface of the finless section at the middle of the flat tube becomes tilted or substantially horizontal, and a part of the twisted finless sections of adjacent flat tubes 3 overlap with each other, that is, as shown in FIG. 10, the portion 3334, close to the long edge, of the middle portion of the connecting section of the upper flat tube overlaps the portion 3335 (as shown by a dotted line in the Figure), close to the short edge, of the middle portion of the connecting section of the lower flat tube. A torsion at a certain angle is generated at the junction of the finless section at the middle of the flat tube and the first straight section 31 of the flat tube to form the foregoing first twisted section 331, and a torsion at a certain angle is generated at the junction of the finless section at the middle of the flat tube and the second straight section 32 of the flat tube to form the foregoing second twisted section 332.

The clamp 9 includes an upper clamp 91 and a lower clamp 92, the lower clamp 92 is a positioning block for positioning the heat exchanger, and the upper clamp 91 is a pressing block for pressing one side of the finless section of the flat tube 3. The lower clamp 92 has an elongated strip shape, which has a flat upper surface 921 and angulated portions 922 located on two sides of the upper surface 921, and the angulated portions 922 are each formed as a right angle or an angle R with a curvature. In this embodiment, the upper surface 921 is horizontally arranged, and of course, in other embodiments, the upper surface 922 may also be vertically arranged. The clamp 9 may also include a guide rail (not shown) which is slidable back and forth, and in the process when the flat tube 3 is tightly pressed by the upper clamp 91, the heat exchanger may move appropriately in the direction of the arrow in cooperation with the guide rail to adjust the position.

The surfaces, that are in contact with the flat tube 3, of the upper clamp 91 and the lower clamp 92 are planes. Thus in the bending process, when a distance between the upper clamp 91 and the lower clamp 92 is very small and the connecting section 333 of the flat tube 3 is clamped very tightly by the upper clamp 91 and the lower clamp 92, the middle portion of the connecting section 333 of the flat tube 3 formed after the bending process is substantially planar. When the distance between the upper clamp 91 and the lower clamp 92 is a little larger and the connecting section 333 is not clamped very tightly by the upper clamp 91 and the lower clamp 92, the middle portion of the connecting section 333 of the flat tube 3 formed after the bending process has an arc shape, or a substantially arc shape as described above.

According to the above-described manufacturing process of the heat exchanger, the bending height H1 (as shown in FIGS. 2 and 5) of the flat tube of the heat exchanger is also related to the distance L (as shown in FIGS. 1 and 2) between the straight sections of adjacent flat tubes in addition to the dimensions of the flat tube, such as the width W of the flat tube (as shown in FIGS. 3 and 4) and the thickness T of the flat tube (as shown in FIG. 4). In summary, the relationship between the bending height H1 of the flat tube of the heat exchanger and various parameters can be generalized as:

$$2\left(\frac{WT}{T+L} + \frac{W}{4}\right) + 3 \leq H1 \leq 3\left(\frac{WT}{T+L} + \frac{W}{4}\right) + 5$$

Figure 14:
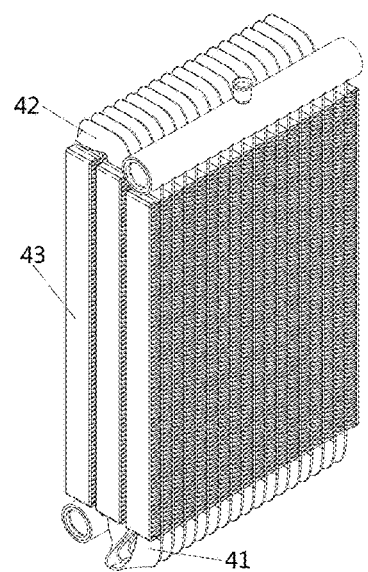
FIG. 14 is a schematic view showing the structure of the heat exchanger according to another embodiment of the present application.

In the above embodiments, the heat exchanger is a double-layer heat exchanger. In other embodiments, the heat exchanger may also be a three-layer heat exchanger or a heat exchanger having more than three layers. As shown in FIG. 14, a three-layer heat exchanger is provided according to another embodiment of the present application. In the three-layer heat exchanger, the flat tube includes a first straight section, a second straight section and a first bent section 41. The first straight section and the second straight section of the three-layer heat exchanger are similar to the first straight section 31 and the second straight section 32 of the double-layer heat exchanger in the above embodiments respectively, and the first bent section 41 of the three-layer heat exchanger is similar to the bent section 33 of the double-layer heat exchanger in the above embodiments. The three-layer heat exchanger further includes a third straight section 43 and a second bent section 42 connecting the third straight section 43 with the second straight section. The first straight section of the flat tube is in communication with the first manifold of the heat exchanger, the third straight section 43 of the flat tube is in communication with the second manifold of the heat exchanger. The second bent section 42 of the flat tube may also be bent by using a method similar to the above-described method for forming the bent section 33, and the formed second bent section 42 of the flat tube also has a structure similar to the structure of the bent section 33 of the flat tube in the embodiment as shown in FIG. 1. In the heat exchangers which have three or more than three layers according to the embodiments of the present application, the first straight section of the flat tube of the heat exchanger is in communication with the first manifold, and the last straight section of the flat tube is in communication with the second manifold, the rest may be understood by analogy, thus there is no need to illustrate and exemplify the rest structures one by one herein.

In the flat tube of the heat exchanger according to the present application, the bent section includes the first twisted section, the second twisted section, and the connecting section connecting the first twisted section with the second twisted section, and the outer surface of the connecting section is limited by the planar clamp, thus the connecting section of the flat tube has a substantially flat shape or a flat arc shape. In this way, the height of the bent heat exchanger can be reduced, which facilitates the installation, and such bending manner does not require to reserve a long bending radius, which can increase the length of the fined section in a case that the flat tube has a fixed length, thus the heat exchange performance of the heat exchanger can be improved.

A method for bending the heat exchanger is further provided according to the present application. One embodiment of the method can be used in the above manufacturing process of the heat exchanger 100 to bend the heat exchanger 100. The embodiment includes the following steps.

Step S1 may include providing a heat exchanger to be bent as shown in FIG. 11, which includes the first manifold 1, the second manifold 2, multiple straight flat tubes 3, and fins 4. The structures of these components and the positional relationship therebetween have been described in detail in the above description of FIG. 9, which will not be described herein.

Step S2 may include providing the clamp 9 as shown in FIG. 12, and clamping, by the clamp 9, the middle portion of the finless section of the flat tube 3, that is, a portion of the finless section to be formed as the connecting section 333. According to the above description of FIG. 12, when the flat tube 3 is clamped by the clamp 9, a distance between the upper clamp 91 and the lower clamp 92 of the clamp 9 may be predetermined according to a desired shape of the connecting section 333 to be formed.

Step S3 may include twisting the finless section of the flat tube 3 to form the shape shown in FIG. 1. The twisting means may include pressing the middle portion of the finless section by the clamp 9 and twisting the middle portion of the finless section with respect to the first straight portion 31 and the second straight portion 32. After the twisting operation, the twisted finless sections of the adjacent flat tubes 3 are partially overlapped with each other, that is, as shown in FIG. 10, the portion 3334, close to the long edge, of the middle portion of the connecting section of the upper flat tube overlaps the portion 3335 (as shown by a dotted line in the Figure), close to the short edge, of the middle portion of the connecting section of the lower flat tube. A torsion at a certain angle is generated at the junction of the finless section at the middle of the flat tube 3 and the first straight section 31 of the flat tube 3 to form the foregoing first twisted section 331, and a torsion at a certain angle is generated at the junction of the finless section at the middle of the flat tube 3 and the second straight section 32 of the flat tube 3 to form the foregoing second twisted section 332.

It should be appreciated that, the sequence of the step S3 and the step S2 may be reversed, that is, firstly, another means except for the clamp 9 is used to twist the finless section of the flat tube 3 to form the first twisted section 331 and the second twisted section 332, and then the clamp 9 is used to clamp the middle portion of the finless section of the flat tube 3, and especially the upper clamp 91 is used to press one side of the finless section to prepare for the subsequent bending operation.

Figure 13:
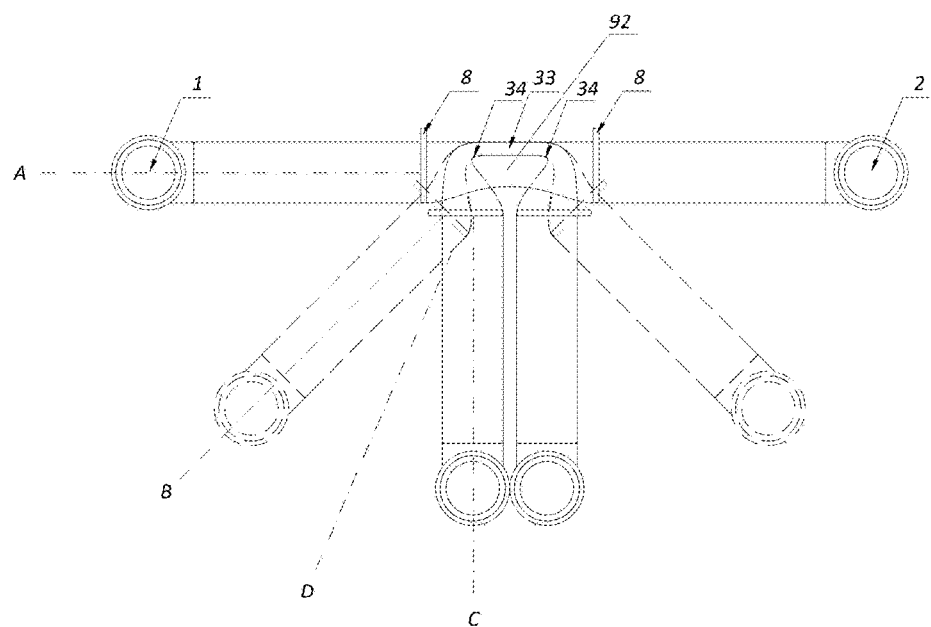
FIG. 13 is a schematic view showing various positions where the heat exchanger shown in FIG. 12 will reach in the bending process.

Step S4 may include applying a bending force P to the first manifold 1 and the first straight portion 31 connected to the first manifold 1, and the second manifold 2 and the second straight portion 32 connected to the second manifold 2, as shown in FIGS. 12 and 13, and to allow the first manifold 1 and the second manifold 2 to be close to each other in a state that they are always parallel to each other, thereby bending the middle portion of the finless section of the flat tube 3 to form the connecting section 333 connecting the first twisted section 331 with the second twisted section 332. The connecting section 333, the first twisted section 331 and the second twisted section 332 form the bent section 33. According to the distance between the upper clamp 91 and the lower clamp 92 which is determined in the step S2, the connecting section 333 may be formed as a flat plate shape, an arc shape, or the above-described substantially arc shape, and etc.

The step S4 may include the following substeps. The substeps are described below in conjunction with FIG. 13.

Step S41 may include applying a bending force P to the flat tube 3, to move the heat exchanger from an initial position A, through an intermediate position B and finally to a bending position C shown in FIG. 13. In the process of applying the force, the finless section of the flat tube 3 tightly abuts against the two angulated portions 922 of the lower clamp 92, thereby forming a crease 34 between the first twisted section 331 and the connecting section 333, as well as between the second twisted section 332 and the connecting section 333. Apparently, in the process of applying the force, the heat exchanger is limited by the clamp 9, thereby facilitating improving the controllability of the bending process.

Step S42 may include pulling the first straight section 31 and the second straight section 32 outwardly along the creases 34 respectively by a certain distance after the heat exchanger reaches the bending position, and unfolding the heat exchanger from the bending position C to a removing position D, to facilitate removing the heat exchanger from the clamp 9. Apparent, the creases 34 may facilitate the pulling operation.

Step S5 may include removing the heat exchanger adjusted to the removing position D from the clamp 9.

Step S6 may include pressing the first straight section 31 and the second straight section 32 inwardly along the creases 34 to reshape the heat exchanger. It should be noted that, since the creases has a memory function in a certain range, the heat exchanger can be readjusted from the removing position D to the bending position C by the reshaping operation.

Figure 15:
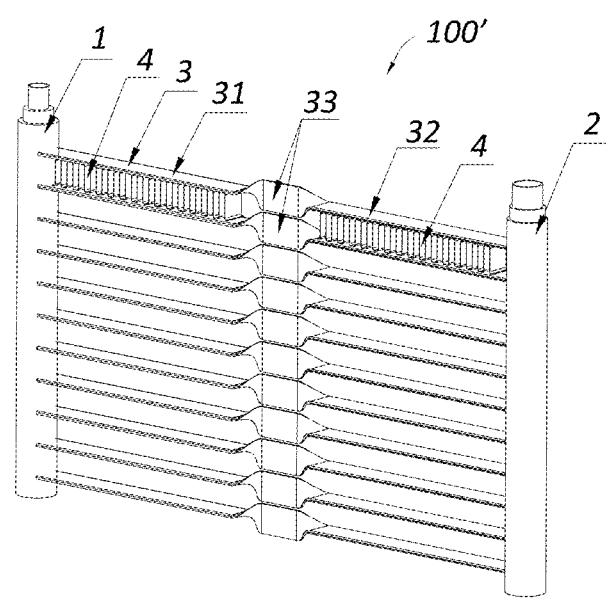
FIG. 15 is a schematic view showing the structure of the heat exchanger to be bent according to another embodiment of the present application.

Further, in the methods for bending the heat exchanger according to other embodiments of the present application, the steps S2 and S3 may also be performed before the step S1, that is, firstly, multiple straight flat tubes 3 are provided, and then the flat tubes 3 are twisted before being assembled with the first manifold 1 and the second manifold 2 to form the heat exchanger to be bent, thus two ends of the middle portion of the flat tube 3 respectively form the first twisted portion 331 and the second twisted portion 332. For example, the heat exchanger 100' to be bent as shown in FIG. 15 is formed by first twisting the flat tube 3 and then assembling the flat tube 3 with the first manifold 1 and the second manifold 2. In this way, the operations of the steps S4 to S6 can be directly performed on the heat exchanger 100' to be bent.

It should be noted that, the above embodiments are only intended for describing the present application, and should not be interpreted as limitation to the technical solutions of the present application. Although the present application is described in detail in conjunction with the above embodiments, it should be understood by the skilled in the art that, modifications or equivalent substitutions may still be made to the present application by those skilled in the art; and any technical solutions and improvements thereof without departing from the spirit and scope of the present application also fall into the scope of the present application defined by the claims.

The invention claimed is:

1. A bent heat exchanger, comprising a first manifold, a second manifold, and a plurality of flat tubes each being configured to communicate the first manifold with the second manifold and having a flow channel, wherein, the flat tube comprises a first straight section, a second straight section and a bent section between the first straight section and the second straight section, fins are provided between the first straight sections of adjacent flat tubes, fins are also provided between the second straight sections of adjacent flat tubes, and no fins are provided between the bent sections of adjacent flat tubes;

the bent section comprises a first twisted section, a second twisted section, and a connecting section between the first twisted section and the second twisted section, and at least a part of a line, formed along a width direction of the flat tube, of a middle portion of an upper surface of the connecting section of the bent section has a linear shape; middle portions of the connecting sections of adjacent flat tubes are arranged to be partially overlapped;

a bending angle is formed at a junction of the connecting section and the first twisted section of the flat tube, as well as a junction of the connecting section and the second twisted section of the flat tube, the bending angle being an acute angle;

a middle portion of a cross-section, taken along a flow direction of the flat tube, of the connecting section has a flat shape;

in the plurality of flat tubes, at least a partial area of an upper surface of the connecting section of the bent section of each of at least a part of the flat tubes is planar; and the connecting section comprises a short edge at a lower position, and a long edge at a higher position, the long edge has a length greater than a length of the short edge, and a middle portion of the long edge has a linear shape;

the connecting section further comprises two arc-shaped lateral edges connecting the short edge with the long edge, the arc-shaped lateral edge on one side is connected to the first twisted section, and the arc-shaped lateral edge on the other side is connected to the second twisted section; and in two adjacent flat tubes, a portion, close to the long edge, of the middle portion of the connecting section of one flat tube overlaps a portion, close to the short edge, of the middle portion of the connecting section of another flat tube, and there is a gap between portions of the connecting sections of the two adjacent flat tubes except for the overlapped portions.

2. The bent heat exchanger according to claim 1, wherein a height H1 of the bent section of the flat tube satisfies the following formula:

$$2\left(\frac{WT}{T+L} + \frac{W}{4}\right) + 3 \leq H1 \leq 3\left(\frac{WT}{T+L} + \frac{W}{4}\right) + 5$$

wherein W is a width of the flat tube, T is a thickness of the flat tube, L is a distance between the straight sections of adjacent flat tubes.

3. The bent heat exchanger according to claim 1, wherein the first straight section and the second straight section of the flat tube are substantially arranged in the same plane, and extending directions of the first straight section and the second straight section in the same plane are parallel with each other or form a certain angle.

4. The bent heat exchanger according to claim 1, wherein the first twisted section of the bent section of the flat tube is formed by twisting one end of the first straight section along an axis at an angle with respect to a surface of the flat tube, the second twisted section of the bent section of the flat tube is formed by twisting one end of the second straight section along an axis at an angle with respect to the surface of the flat tube, and the connecting section is formed by bending tail ends of the first twisted section and the second twisted section along an axis parallel to a width direction of the flat tube.

5. The bent heat exchanger according to claim 4, wherein on a side where the long edge of the connecting section is located, a torsion angle of each of the first twisted section and the second twisted section with respect to the connecting section is an acute angle; and on a side where the short edge of the connecting section is located, a torsion angle of each of the first twisted section and the second twisted section with respect to the connecting section is an obtuse angle.

6. The bent heat exchanger according to claim 4, wherein a curvature radius of a cross-section, taken along the flow direction of the flat tube, of the middle portion of the connecting section is greater than a curvature radius of a cross-section of each of the junction of the connecting section and the first twisted section and the junction of the connecting section and the second twisted section.

7. The bent heat exchanger according to claim 1, wherein the bent heat exchanger is a heat exchanger having at least three layers, the flat tube at least further comprises a third straight section and a second bent section between the third straight section and the second straight section, the first straight section of the flat tube is in communication with the first manifold of the heat exchanger, and the third straight section of the flat tube is in communication with the second manifold of the heat exchanger.

8. The bent heat exchanger according to claim 1, wherein extending directions of the first straight section and the second straight section are parallel with each other.

9. The bent heat exchanger according to claim 1, further comprising side plates arranged at two ends of the bent heat exchanger.

10. The bent heat exchanger according to claim 9, further comprising outer fins arranged at the two ends of the heat exchanger, and wherein the plurality of side plates are arranged outside the outer fins.

* * * * *